United States Patent
Liu et al.

(10) Patent No.: US 9,049,146 B2
(45) Date of Patent: Jun. 2, 2015

(54) AUTOMATICALLY CONNECTING REMOTE NETWORK EQUIPMENT THROUGH A GRAPHICAL USER INTERFACE

(75) Inventors: Huan Liu, Sunnyvale, CA (US); Dan Orban, Sunnyvale, CA (US)

(73) Assignee: Accenture Global Services Limited, Dublin (IE)

( * ) Notice: Subject to any disclaimer, the term of this patent is extended or adjusted under 35 U.S.C. 154(b) by 186 days.

(21) Appl. No.: 12/256,343

(22) Filed: Oct. 22, 2008

(65) Prior Publication Data

US 2010/0100767 A1 Apr. 22, 2010

(51) Int. Cl.
- *G06F 15/177* (2006.01)
- *H04L 12/26* (2006.01)
- *H04L 12/24* (2006.01)

(52) U.S. Cl.
CPC ............ *H04L 43/50* (2013.01); *H04L 12/2697* (2013.01); *H04L 41/0806* (2013.01); *H04L 41/0856* (2013.01); *H04L 41/145* (2013.01); *H04L 41/22* (2013.01)

(58) Field of Classification Search
CPC ... H04L 41/0806; H04L 41/145; H04L 41/22; H04L 12/2697; H04L 43/50
USPC ........................................................ 709/220
See application file for complete search history.

(56) References Cited

U.S. PATENT DOCUMENTS

| | | | |
|---|---|---|---|
| 5,027,343 A | | 6/1991 | Chan et al. |
| 5,442,630 A * | | 8/1995 | Gagliardi et al. ............. 370/402 |
| 5,822,520 A * | | 10/1998 | Parker ............................ 709/230 |
| 6,182,077 B1 * | | 1/2001 | Tokumine et al. ...................... 1/1 |
| 6,397,117 B1 * | | 5/2002 | Burrows et al. .................. 700/97 |
| 7,133,906 B2 * | | 11/2006 | Price et al. ..................... 709/220 |
| 7,225,117 B1 * | | 5/2007 | Feldstein et al. ................ 703/21 |
| 7,720,864 B1 * | | 5/2010 | Muth et al. ..................... 707/785 |
| 2001/0005856 A1 * | | 6/2001 | Tomikawa et al. ............ 709/208 |
| 2002/0042706 A1 * | | 4/2002 | Rodriguez ...................... 703/22 |
| 2002/0052941 A1 * | | 5/2002 | Patterson ....................... 709/223 |
| 2002/0057018 A1 * | | 5/2002 | Branscomb et al. ............ 307/42 |
| 2002/0174207 A1 | | 11/2002 | Battou |
| 2003/0074606 A1 * | | 4/2003 | Boker ............................. 714/42 |

(Continued)

FOREIGN PATENT DOCUMENTS

| | | |
|---|---|---|
| CN | 101009594 | 8/2007 |
| EP | 0099978 | 8/1984 |

(Continued)

OTHER PUBLICATIONS

Fu Binzhang Zhang, Espacenet Bibliographic Data: CN101009594, Abstract of CN1001009594, Aug. 1, 2007, p. 1, People's Republic of China.

*Primary Examiner* — John Macilwinen
(74) *Attorney, Agent, or Firm* — Fish & Richardson P.C.

(57) ABSTRACT

Embodiments of the present invention provide a method and system for designing a test network in an integrated application, and configuring remote network devices through a network design application to test a network design. One embodiment of the present claimed subject matter is provided as a system for automatically configuring remote network devices to simulate a network connection. The system includes a plurality of computing devices which are physically coupled to one or more network devices, wherein the network devices are automatically configured to comprise a test network corresponding to a remote test network topology design.

43 Claims, 11 Drawing Sheets

(56) References Cited

U.S. PATENT DOCUMENTS

| | | | |
|---|---|---|---|
| 2003/0212908 A1* | 11/2003 | Piesco | 713/201 |
| 2004/0088605 A1 | 5/2004 | Nakamoto et al. | |
| 2004/0143428 A1* | 7/2004 | Rappaport et al. | 703/22 |
| 2004/0202160 A1* | 10/2004 | Westphal | 370/389 |
| 2007/0143465 A1 | 6/2007 | Gonzalez et al. | |
| 2007/0288607 A1* | 12/2007 | Hsieh | 709/220 |
| 2010/0031093 A1* | 2/2010 | Sun et al. | 714/45 |

FOREIGN PATENT DOCUMENTS

| | | |
|---|---|---|
| WO | 0161890 | 8/2001 |
| WO | 2006010381 | 2/2006 |

\* cited by examiner

AUTOMATICALLY CONNECTING REMOTE NETWORK EQUIPMENT THROUGH A GRAPHICAL USER INTERFACE

BACKGROUND OF THE INVENTION

Computer networks have become the dominant medium for the communication and exchange of data. The advent of the Internet in particular has spurred further developments in the field of computer networking. Today, larger computer networks can comprise robust, sophisticated systems capable of exchanging enormous amounts of data at impressive rates among a vast number of distributed computer systems.

These larger computer networks may be implemented to include a variety of network components. Common network components (both hardware and software) are integrated to enhance the performance of the network, and to provide additional network functionality. These components may include dedicated servers that offer additional storage and processing capabilities; network routers that provide optimized packet routing and shared network access; and firewall software to provide network security. Often, each component must be individually configured to provide the desired level of security, privacy and efficacy. Accordingly, a principle challenge in the field of computer networking is to design these multi-component, distributed systems to be able to efficiently and consistently exchange large amounts of data while effectively preventing unauthorized infiltration and limiting network failures.

The field of network design has developed in response to address this need. The goal of this particular field is to optimize the architecture of the network by selecting the appropriate component hardware devices and configuring the devices to be capable of communication with other network constituents and to meet desired performance levels.

However, configuring a network can be a tedious and error prone process. Hardware may behave unexpectedly and differently than intended or designed. Furthermore, each device in a network is typically locally configured, but as part of a network, any misconfiguration may have a global impact which can be difficult to identify and impossible to correct remotely. Errors in configuration can result in packet (data) loss, additional latency, vulnerability to security breaches or even total network communication failure.

In order to avoid disruption to a production network, one conventionally employed technique is for network engineers to construct a test network of the network component devices (usually according to a smaller scale) that will comprise a potential network. The potential network is subsequently tested according to one or more configurations to verify the network's viability prior to implementing the configuration to a production network.

Currently, the components used in a test network are typically interconnected by physical wires. For practical reasons, this requires that all of the equipment used in the testing be located in the same general physical location, and typically requires a large inventory of network component devices to enable comprehensive testing. Accordingly, storage for the network component devices may require a considerable amount of space; likewise, a deployment of the test network may also require additional physical lab space. Additionally, it may be difficult to remotely perform network design and testing from the inventory according to this technique.

For example, misconfigured devices may be inaccessible remotely. Likewise, sharing equipment among distributed locations may be inconvenient and prohibitively impractical. The cost of provisioning fully-functioning testing labs at discrete locations can be enormous. Finally, since previously assembled configurations are not typically stored, test networks often require individual assembly, and physically setting up and reconfiguring a test environment for each and every test network can be inefficient and labor-intensive.

A different technique conventionally employed is referred to as router tunneling. Router tunneling is typically implemented by encapsulating network protocol within a different delivery protocol. Router tunneling is commonly used to create virtual private networks (VPNs). By creating a VPN between two or more devices (typically discrete computers), the devices may be locally configured and the transfer of data may be monitored. However, the behavior of the network devices along the transfer route (e.g., routers) may not always be consistent with the behavior of the devices in a traditional network (e.g., not a VPN). For example, under typical router tunneling configurations, the routers comprising the network need to be specifically configured to allow for router tunneling, and thus may not be configured to transmit data without router tunneling.

Since local networks may not require router tunneling, the behavior of the router tested using router tunneling may be inconsistent with how the router will actual behave in practice. Moreover, the configuration of the tunnels may be overwritten when duplicating subsequent test configurations. Furthermore, other network devices may not support tunnels. For example, firewalls and network servers typically do not support router tunneling. Accordingly, a test network may be exceedingly difficult to simulate via router tunneling with any appreciable accuracy.

Yet another conventional technique is to simulate a test network by virtually emulating the network devices (e.g., routers) comprising the test network. Software emulating the features and the behavior of the routers is deployed and tested for network feasibility prior to the physical implementation of the network according to the network design. However, emulation of network devices cannot capture all aspects of a real network. For example, configuration and simulated behavior is strictly limited to the simulation models according to the software, which may not be entirely comprehensive. Often, this manifests as a limited number of available commands and a lack of comprehensive support.

Additionally, for emulation of a network device to be possible, simulation models must be available to correspond to the version or iteration of the particular network device of the design. These simulation models may not be available for some time after the release of a particular device, if at all. For example, a common practice for network device manufacturers is to release firmware updates for released products to address defects discovered after release. A product can be "flashed" (e.g., have its operating software updated) with the updated firmware to remove the addressed defects. However, even if emulation software for the particular device is available, the software may also need to be updated to correspond with firmware updates in order to align with the behavior of the actual device. This inconsistency may result in wasted time due to unnecessary or incorrect configuration.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The claimed subject matter is directed to a method and system for designing a test network in an integrated application, and configuring remote network devices through a network design application to test a network design.

In one embodiment, a system is provided to connect two network devices remotely through the Internet. According to the embodiment, each of the network devices is physically connected to a computing device. The computing device is configured to capture all data packets coming out of the network device, and under the program control, each computing device is configured to be able to deliver the packet to any other router. Together, these computing devices are implemented to simulate physical wires.

In another embodiment, a graphical user interface is provided from where a user is able to design a test network topology. A plurality of network components comprising a test network topology which each corresponds to an actual physical component equivalent is used to design a test network. The user is able to deploy the design, after which instructions are sent to the various computing devices connected to the physical component equivalent to construct the topology based on the user design.

In yet another embodiment, a method is provided to design a test network topology in a graphical user interface.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
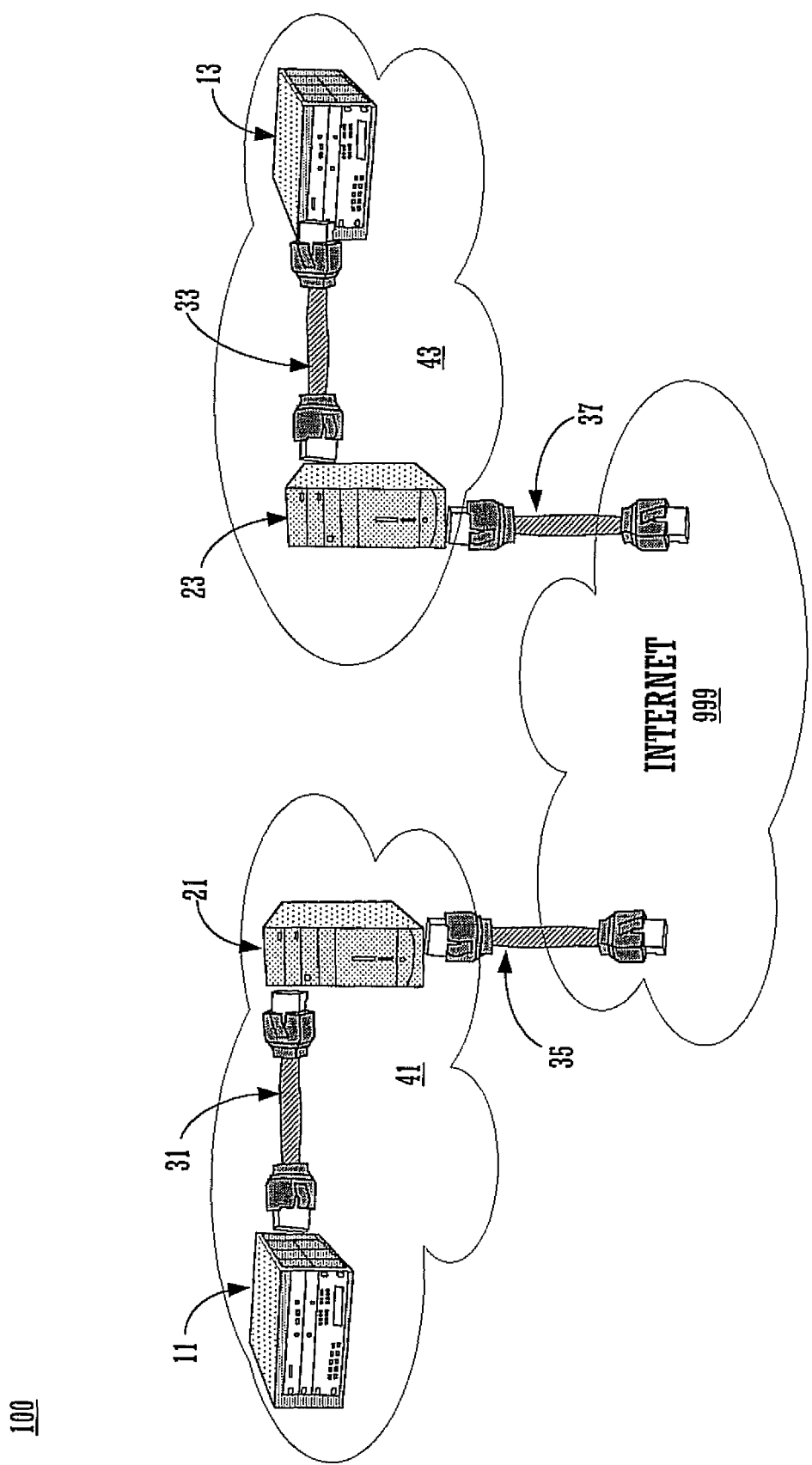
FIG. 1 is an illustration of an exemplary system for configuring remote network devices, in accordance with various embodiments of the claimed subject matter.

Reference will now be made in detail to the preferred embodiments of the claimed subject matter, a method and system for the use of a reputation service provider, examples of which are illustrated in the accompanying drawings. While the claimed subject matter will be described in conjunction with the preferred embodiments, it will be understood that they are not intended to be limit to these embodiments. On the contrary, the claimed subject matter is intended to cover alternatives, modifications and equivalents, which may be included within the spirit and scope as defined by the appended claims.

Furthermore, in the following detailed descriptions of embodiments of the claimed subject matter, numerous specific details are set forth in order to provide a thorough understanding of the claimed subject matter. However, it will be recognized by one of ordinary skill in the art that the claimed subject matter may be practiced without these specific details. In other instances, well known methods, procedures, components, and circuits have not been described in detail as not to unnecessarily obscure aspects of the claimed subject matter.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present claimed subject matter, discussions utilizing terms such as "storing," "creating," "protecting," "receiving," "encrypting," "decrypting," "destroying," or the like, refer to the action and processes of a computer system or integrated circuit, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Accordingly, embodiments of the claimed subject matter provide a method and system for designing a test network in an integrated application, and configuring remote network devices through a network design application to test a network design.

Exemplary Connection System

With reference now to FIG. 1, an illustration of an exemplary system 100 for configuring remote network devices to simulate a network connection is depicted, in accordance with various embodiments of the claimed subject matter. While exemplary system 100 is shown as incorporating specific, enumerated features and elements, it is understood that such depiction is exemplary. Accordingly, embodiments are well suited to applications involving different, additional, or fewer elements, features, or arrangements.

In a typical configuration, system 100 includes a plurality of remote networking devices (e.g., routers 11 and 13) coupled to a plurality of corresponding networking clients (e.g., clients 21 and 23). As shown, clients may be discrete personal computers or any other network attached device, such as a server. In one embodiment, the networking devices may be routers. In alternate embodiments, networking devices may vary, but will typically include layer 2/3 switching and routing functionality.

Exemplary system 100 is also presented as including a plurality of data transport cables (e.g., Ethernet cable 31, 33, 35, 37) physically connecting each of the network devices 11, 13 to a corresponding client 21, 23, and each client 21, 23, to the Internet 999. In one embodiment, the Ethernet cables 31 and 33 connect the connection interfaces of the network device to the connection interfaces of a client. A connection interface of a network device may, for example, be an Ethernet interface having one or more Ethernet ports. In some embodiments, the connection interface of a client may also consist of one or more Ethernet ports of a network interface controller. A network interface controller may be implemented through network interface cards and universal serial bus (USB) based console ports.

According to one embodiment, a port of the connection interface of a network device 11 is thus physically connected to a port of the connection interface of a client 21 via an Ethernet cable 31. The connection interface of network device 13 is similarly connected physically to the connection interface of the client 23 via Ethernet cable 33. In typical embodiments, the connection interfaces of one or more of the network devices 11, 13 in system 100 may comprise a plurality of ports. Each port may be further connected to an unoccupied port of the connection interface of the corresponding client via an additional Ethernet cable (not displayed).

As presented, the system 100 includes a plurality of "paired" components, including at least one networking device proximately located and physically connected to a corresponding networking client. Thus, as shown in FIG. 1, network device 11 corresponds to networking client 21 and network device 13 corresponds to networking client 23. In a typical configuration, each of the pairs of components is remotely located from the other, and is capable of transferring data to the other pair through the networking client connected to the Internet. In some embodiments, each pair of components and any attached data transport mediums (e.g., data transport cables) comprise a local network (e.g., local networks 41 and 43). Each local network 41 and 43 may be remotely distributed, and are configured to communicate with each other through the Internet 999.

In further embodiments, each connection interface of a network device and/or a networking client can comprise a plurality of connection ports. In these embodiments, each port of a networking device may be connected to an additional (unoccupied) port of the corresponding networking client.

In still further embodiments, each networking client may correspond to a plurality of network devices. According to these embodiments, a plurality of desired ports from one or more of the plurality of network devices may be connected to ports of the network interface controller of the networking client. In some configurations, the network client may not have sufficient Ethernet ports on an attached network adapter card. In even further configurations, the network client may not have an attached network adapter card at all. Accordingly, a plurality of network ports may be implemented as one or more USB based network ports.

The system 100 as described thus comprises an exemplary test network, wherein each of the network devices 11, 13 simulate corresponding network devices in a network. The networking client corresponding to each network device simulates physical cables connecting the network device to other network devices in the network. This is accomplished by the networking client through the capture of data packets sent from the router, and delivers the packet to any other network device comprising the test. The networking client is able to receive and transfer data packets from remote network devices over the Internet via conventional data switching methods and TCP/IP protocols. In one embodiment, each of the networking clients may be operable to receive commands to enable configuration from a remote network client. Accordingly, remote configuration of each of the network devices may be performed by a remote terminal through the network client via the Internet. In further embodiments, testing the network configuration is also performed via the corresponding networking client. A description of testing a network configuration according to the claimed subject matter is provided in the embodiments described below.

Exemplary Local Network

Figure 2:
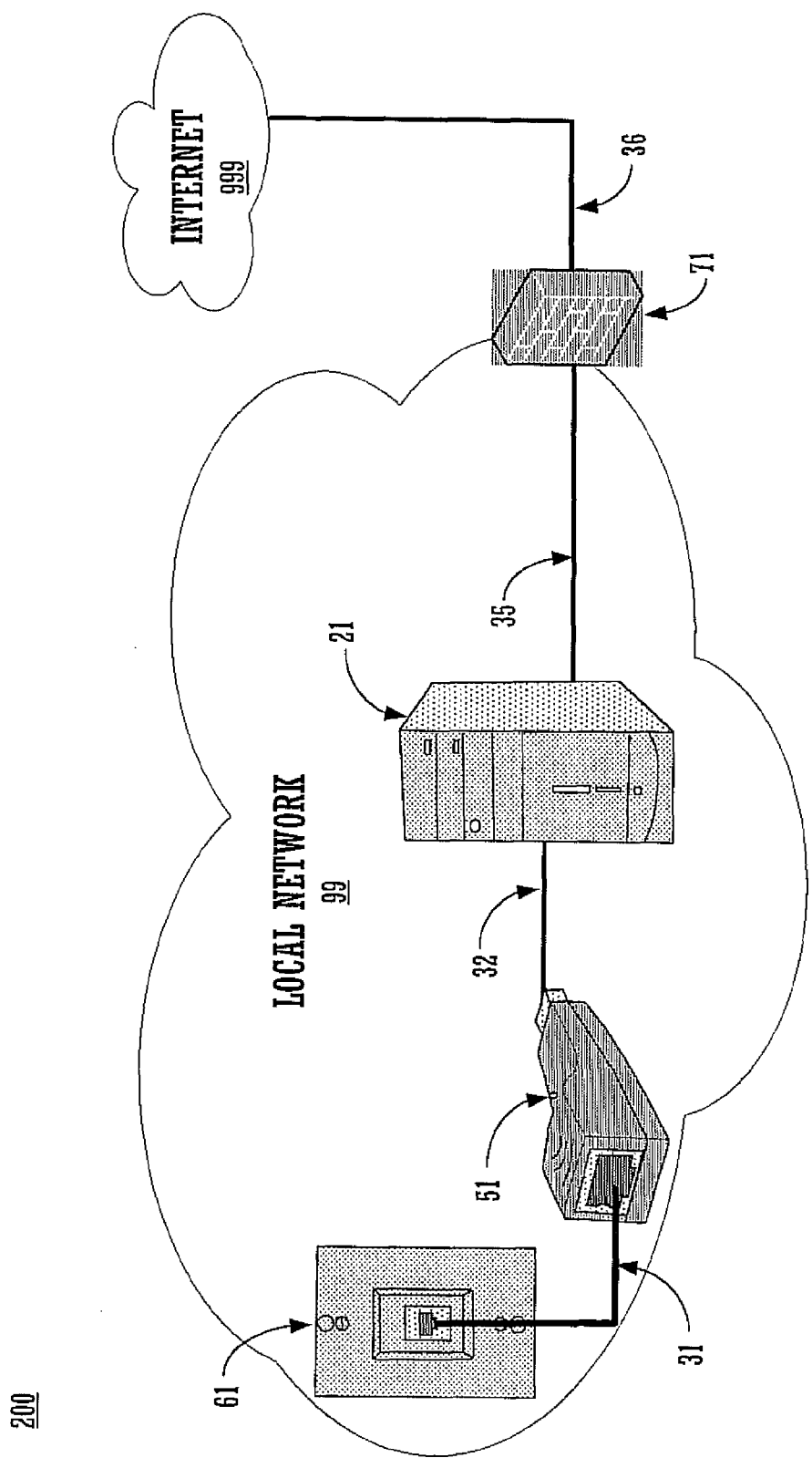
FIG. 2 is an illustration of an exemplary configuration for a local network in a system for automatically configuring remote network devices, in accordance with various embodiments of the claimed subject matter.

With reference now to FIG. 2, an illustration of an exemplary configuration 200 for a local network in a system for automatically configuring remote network devices is depicted, in accordance with various embodiments of the claimed subject matter. In a typical configuration, configuration 200 includes a local network 99 communicatively coupled to the Internet 999. Local network 99 may for example, comprise a local network 41, 43, as depicted in FIG. 1, consisting of a network client 21, 23 and one or more network devices.

As shown, clients may be discrete personal computers or any other network attached computing device. In some embodiments, the networking devices may include switching and routing functionality (e.g., routers, switches, bridges and hubs). In further embodiments, networking devices may also include hardware or software devices operable to transmit and/or manipulate data in a network, such as a network attached printer, server, or firewall.

In one embodiment, local network 99 includes a network client 21 coupled to a connection interface 61 of a network device (not displayed). The network client 21 may be coupled to a connection interface 61 of a network device through the network client's own connection interface (e.g. a network interface controller). In some embodiments, the network interface controller may comprise a network interface card. In further embodiments, the network interface controller may also be implemented to include one or more USB network ports 51. USB network port 51 may be directly connected to a USB interface of network client 21. Alternatively, USB network port 51 may be connected to a USB interface via a USB cable (e.g., USB cable 32). In one embodiment, the USB network port includes an Ethernet interface (e.g., an Ethernet port). The Ethernet interface may be physically connected to the connection interface 61 of the network device via an Ethernet cable (e.g., Ethernet cable 31).

According to some embodiments, a network client 21 may be directly connected to a device providing a point of entry to an Internet Service Provider. According to various embodiments, the point of entry device may vary, but typically is capable of communication according to the border gateway protocol. Typical transmission mediums include an Ethernet cable (e.g., Ethernet cable 35 and 36). In further embodiments, a another network device, such as a router, may be communicatively interposed between the network client and the Internet. In still further embodiments, the network device may provide additional security functionality, such as a firewall 71. In such embodiments, a first Ethernet cable 35 may connect the firewall 71 to the network client 21 with a second Ethernet cable 36 connecting the firewall 71 to the Internet 999.

Figure 3:
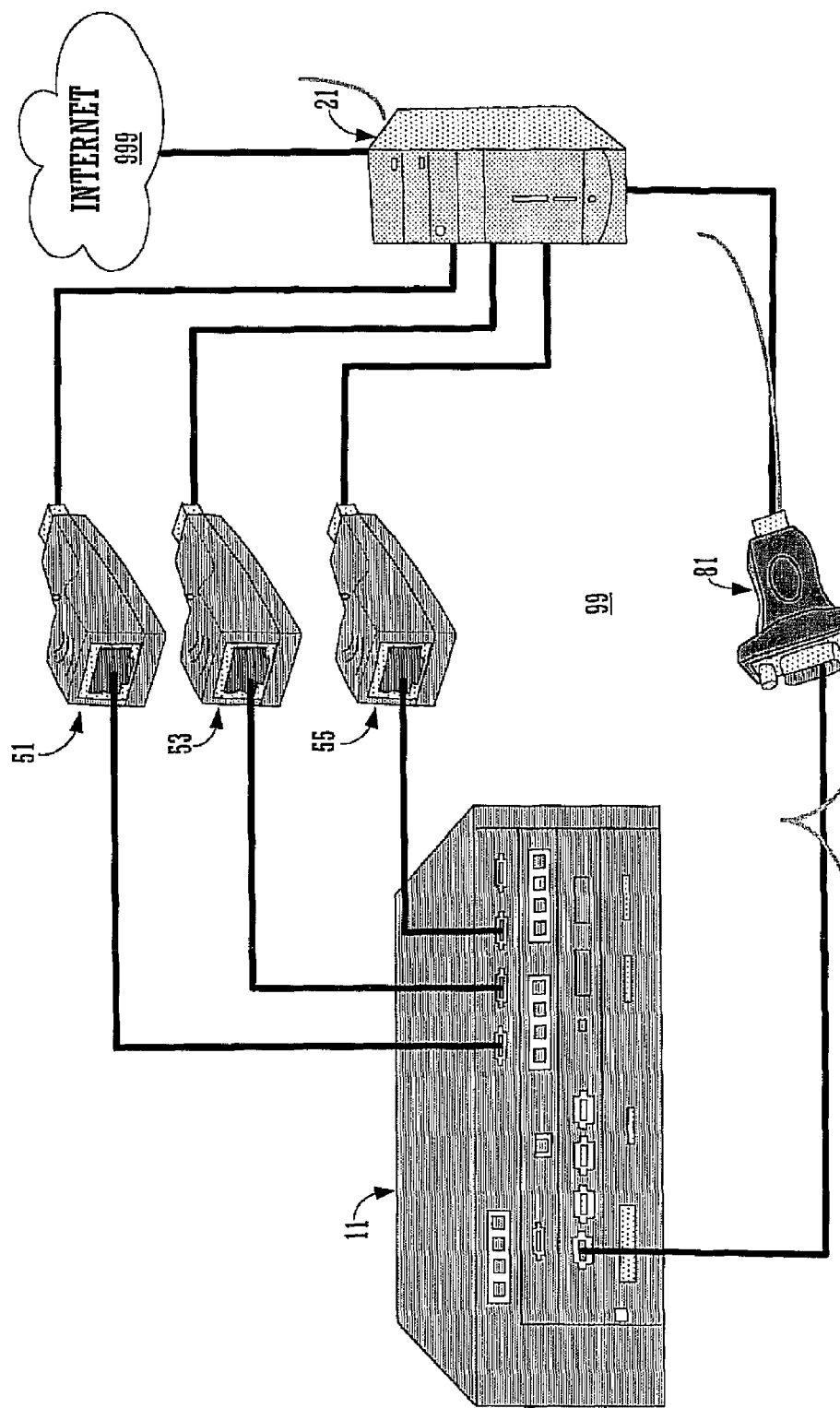
FIG. 3 is an illustration of an exemplary configuration of a local network comprising a router with a plurality of connected ports in a system for automatically configuring remote network devices, in accordance with various embodiments of the claimed subject matter.

With reference now to FIG. 3, an illustration of an exemplary configuration 300 of a local network comprising a router with a plurality of connected ports in a system for automatically configuring remote network devices is depicted, in accordance with various embodiments of the claimed subject matter. In a typical configuration, configuration 300 includes a local network 99 comprising a network client 21 and network device 11. In one embodiment, network client 21 is communicatively coupled to the Internet 999. Network client 21 is further coupled to a network device 11. In some embodiments, network client 21 is physically connected to network device 11 by, for example, an Ethernet cable or any other such physical data transport medium.

As depicted in FIG. 3, network device 11 includes a connection interface comprising a plurality of ports. In one embodiment, some of the ports (of the plurality of ports) are independently coupled to a separate connection interface unit of network client 21 (e.g., USB network ports 51, 53 and 55). In further embodiments, each USB network port 41, 43 and 45 is implemented as an Ethernet port. In alternate embodiments, a connection interface unit may be implemented as an Ethernet port on an Ethernet adapter or any other such implementation of a Network Interface card. According to this embodiment, the network client 21 captures packets sent to and from each of the ports of network device 11 coupled to a USB network port. The network client 21 is thus able to test each of the coupled ports of the network device 11 by generating data packets and monitoring the transmission and reception of the data packets. In further embodiments, the network client 21 is operable to receive commands from a remote system via the Internet 999. Accordingly, configuration 300 enables remote testing of the network device 11.

In further embodiments, a console port of network device 11 is also coupled to the network client 21. As presented in FIG. 3, a console port of network device 11 is coupled through console interface 81. Console interface 81 may be implemented as, for example, a USB based network port coupled to a USB interface of network client 21. In one embodiment, network client 21 is operable to initiate a configuration session for network device 11. Initiating a configuration session may include, for example, instantiating a configuration application providing access to a command line interface which provides functionality to receive configuration commands for the specific network device 11. The network client 21 is thus capable of configuring the coupled network device 11. Accordingly, a network client 21 connected to the Internet 999 may be operable to receive commands from a remote terminal, and subsequently enable a remote configuration of network device 11.

Figure 4:
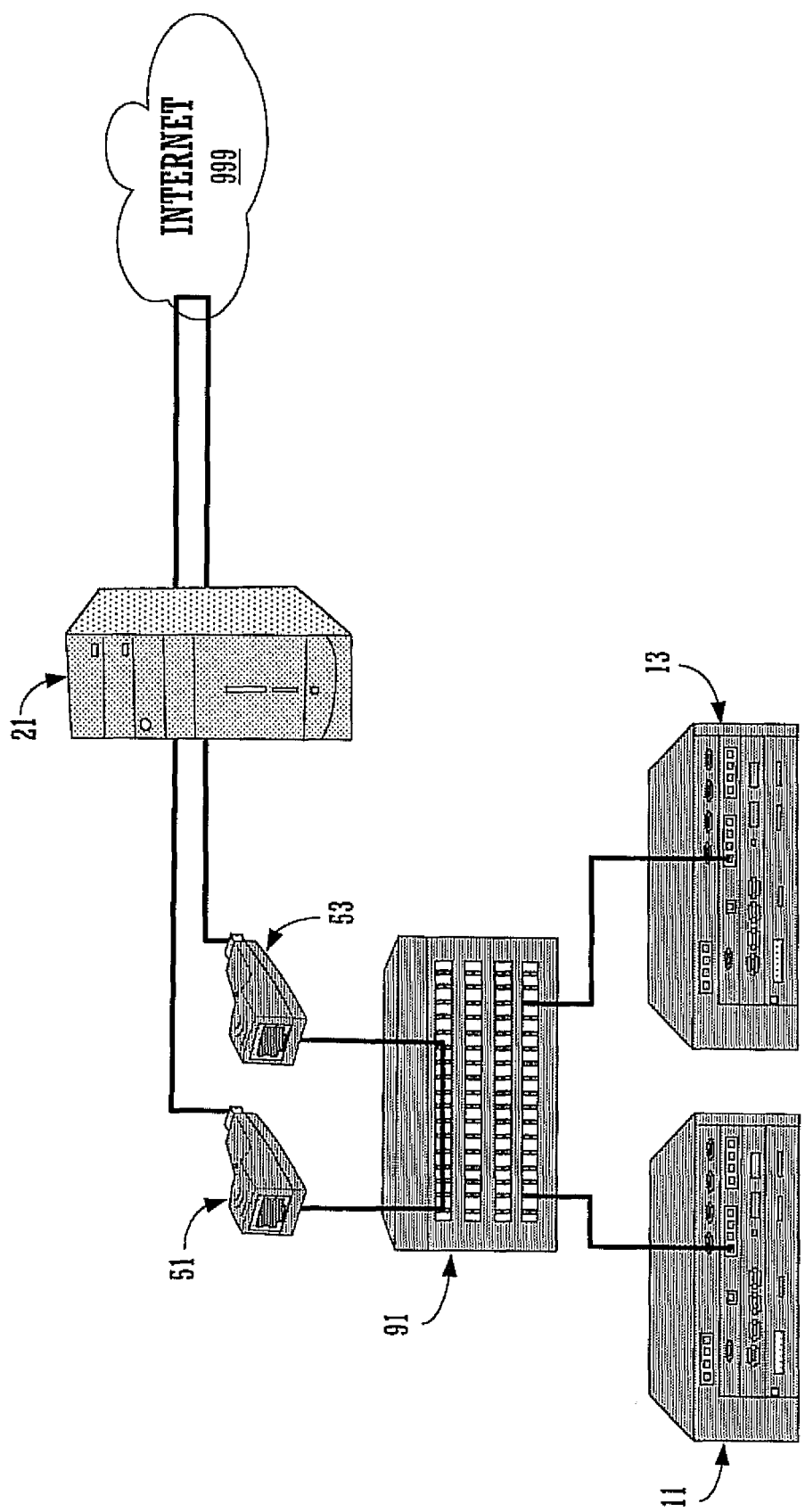
FIG. 4 is an illustration of a configuration of an alternate local network in a system for automatically configuring remote network devices, in accordance with various embodiments of the claimed subject matter.

With reference now to FIG. 4, an illustration of a configuration 400 of an alternate local network in a system for automatically configuring remote network devices is depicted, in accordance with various embodiments of the claimed subject matter. In a typical configuration, configuration 400 includes a local network 99 comprising a network client 21 and network devices (e.g., routers 11 and 13, network test device 91). In one embodiment, network client 21 is communicatively coupled to the Internet 999. Network client 21 is further coupled to network test device 91, which is in turn, coupled to routers 11 and 13. In some embodiments, network client 21 is physically connected to network test device 91. In still further embodiments, network test device 91 may be physically connected to one or both of routers 11 and 13. Physical connection may comprise, for example, an Ethernet cable or other such physical data transport medium.

As depicted in FIG. 4, network test device 91 includes a connection interface comprising a plurality of ports. In one embodiment, some of the ports (of the plurality of ports) are independently coupled to a separate connection interface unit of network client 21 (e.g., USB network ports 51 and 53). USB network port 51, 53 may be implemented as, for example, an Ethernet port. Alternate embodiments have been herein described. As presented, network test device 91 is also coupled to routers 11 and 13.

In one embodiment, the network test device 91 captures packets sent to and from each of the ports of network device 11 coupled to a USB network port. The network test device 91 is thus able to test each of the coupled ports of the network device 11 by generating data packets and monitoring the transmission and reception of the data packets. Accordingly, configuration 300 enables remote testing of the network device 11.

In some embodiments, network test device 91 is operable to receive a plurality of requests (or commands) from network client 21 to perform a plurality of testing functions with connected network devices (e.g., routers 11 and 13). For example, network client 21 may issue a command to generate a data packet in router 11 and to transmit the data packet to router 13. Network test device 91 thus generates a data packet in router 11 and monitors the transmission of the data packet to, and reception in router 13 to verify successful transmission (and reception). Other testing procedures are well known in the art and a description thereof shall be omitted. The network client 21 is thus capable of configuring the coupled network device 11 via network test device 91. Accordingly, a network client 21 connected to the Internet 999 may be operable to receive commands from a remote terminal, and subsequently enable a remote configuration of network device 11 via attached network test device 91.

Exemplary Graphical User Interface

Figure 5:
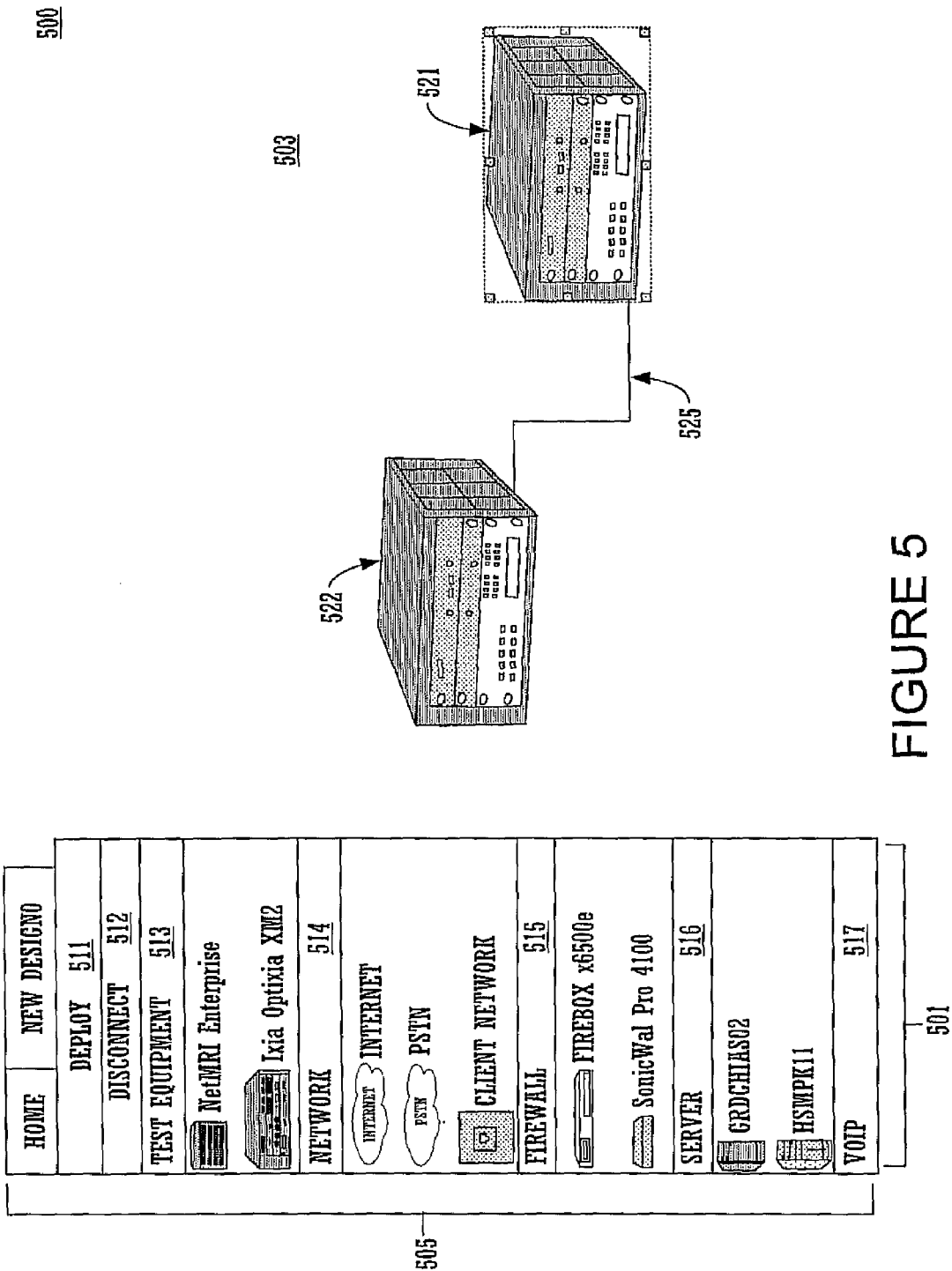
FIG. 5 is an illustration of a graphical user interface in a system for automatically configuring remote network devices, in accordance with various embodiments of the claimed subject matter.

With reference now to FIG. 5, an illustration of a graphical user interface 500 in a system for automatically configuring remote network devices is depicted, in accordance with various embodiments of the claimed subject matter. In a typical configuration, graphical user interface 500 includes a design panel 501 and a design field 503. In one embodiment, design panel 501 may include functionality (e.g., action buttons deploy 511 and disconnect 512) and an inventory of a plurality of components which may be used to comprise a network design (e.g., inventory 505).

In one embodiment, inventory 505 may present the plurality of components as distinguished in separate lists according to function. For example, as depicted, dedicated test devices (e.g., Test Equipment List 513), network structures (e.g., Network List 514), security devices (e.g., Firewall List 515), network attached storage (e.g., Server List 516) and network data devices (e.g., VOIP list 517) are separately distinguished and displayed. In further embodiments, each component in inventory 505 may correspond to a specific physical equivalent communicatively accessible through graphical user interface 500. In still further embodiments, the specific physical equivalents may be remotely located from a terminal instantiating graphical user interface 500 and configurable by graphical user interface 500 through an attached network client communicatively coupled to graphical user interface 500 through a network (e.g., the Internet).

Design field 503 may be implemented as, for example, a virtual design lab wherein a plurality of network components from inventory 505 may be used to graphically represent a test network. In one embodiment, a user may design a test network by selecting a plurality of components from inventory 505 comprising the test network. Each component selected by the user may, for example, appear in design field 503. In further embodiments, each component in inventory 505 corresponds to a unique physical device (e.g., rather than a particular type or model). As such, selecting a component in inventory 505 may remove the component from the inventory 505, and graphically representing the component in design field 503.

A network design may be created in design field 503 by configuring the components in design field 503. Configuration of the components may, for example, include defining one or more connections between the components. As depicted in FIG. 5, design field 503 consists of graphical representations of routers 522 and 521. Router 522 and 521 may be connected through a menu or other such interface instantiated in graphical user interface 500. In one embodiment, a connection may be graphically represented by a line in design field 503 connecting a pair of devices, e.g., line 525. In further embodiments, specific connection interface units (e.g., ports) of the components in design field 503 may be connected. Connections between specific connection interface units may be created automatically by, for example, actuating a pair of connection interface units.

In one embodiment, the components comprising a network in design field 503 may be configured through graphical user interface 500. For example, actuating a component in design field 503 may initiate a configuration session which emulates a command line interface for submitting configuration commands for the component. Once a network design has been completed, a network comprising the physical device equivalents of the components in the design field 503 may be configured by deploying the design. Deploying the design may comprise, for example, actuating the deploy action button 511. Deploying the design may include, for example, automatically configuring the physical device equivalent of a component according to the configuration commands entered for the component in design field 503. Likewise, a component in design field 503 may be removed from the network via an action button (e.g., disconnect button 512).

In further embodiments, testing may be performed on a deployed network via graphical user interface 500. In one embodiment, graphical user interface 500 may include a graphical menu or toolbar (not displayed) which provides testing functionality. Testing functionality may include, for example, creating a test procedure comprising generating a test packet in an actuated component in design field 503, transmitting the test packet in a second actuated component, and monitoring the entire procedure in design field 503. Once a test procedure has been specified in the graphical user interface 500, the test procedure is duplicated in the physical device equivalents. Accordingly, remote testing of a network design comprising physical devices may be performed through graphical user interface 500.

In further embodiments, graphical user interface 500 may include functionality to reserve the plurality of components comprising a network design for a period of time. Communication to the plurality of components is thus inaccessible to other terminals (e.g., other instantiations of graphical user interface 500) for the reserved period of time. Accordingly, remote testing may be performed with the specific physical equivalents of the devices comprising the network design without interference. In one embodiment, a schedule of reservations is stored in a server or other communication hub communicatively coupled to each instantiation of graphical user interface 500.

Network Design

Figure 6:
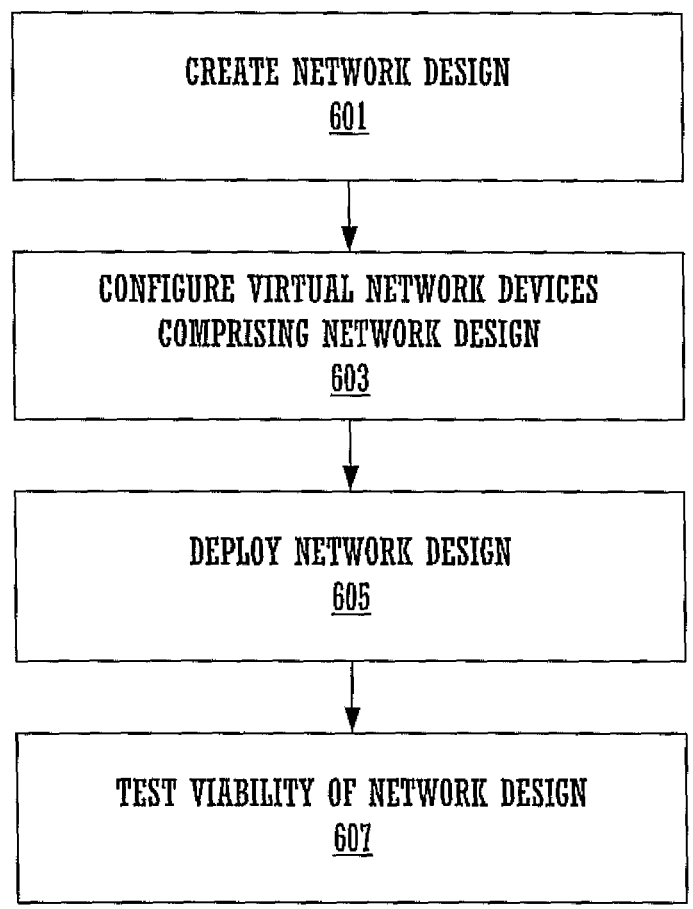
FIG. 6 is a flowchart depicting an exemplary method for designing a network in a system for automatically configuring remote network devices, in accordance with various embodiments of the claimed subject matter.

FIG. 6 is a flowchart depicting an exemplary method 600 for designing a network in a system for automatically configuring remote network devices, in accordance with various embodiments of the claimed subject matter. Steps 601-607 describe exemplary steps comprising the method 600 in accordance with the various embodiments herein described.

According to the method 600 of FIG. 6, a network design is created at step 601. The network design may comprise, for example, a plurality of network components (e.g., routers) coupled to a plurality of network clients (e.g. servers). The network design may further comprise the configuration (e.g., physical connections) between each of the network components and network clients. In further embodiments, the configuration of a network design may include the precise specification of the ports connecting each network component to the ports of other network components and network clients according to the network design.

At step 603, the virtual network devices comprising the test network design created in step 601 is configured. In one embodiment, configuration for each of the virtual network devices may be performed through a network design application, in a process similar to configuring an equivalent physical device. For example, configuring a virtual network device may be performed by initiating a configuration session through the network design application for the virtual network devices. A typical configuration may thus comprise using the network design application to initiate a configuration session and instantiating a configuration interface operable to receive configuration commands to the virtual network device. Once a configuration session is initiated, a user may submit commands to configure the virtual network device via the configuration interface. In some embodiments, the commands may vary to correspond to the specific virtualized hardware device.

At step 605, the network design is deployed. Deployment of the network design typically comprises completing the initialization of the physical network devices, such that the physical network devices are configured to match the configuration of the representative virtual network devices comprising a network design. To configure a physical network device, the network design application may, for example, send the configuration of a virtual network device, as configured in step 603, to the network client directly connected to the physical network device corresponding to the virtual network device. The network client subsequently initiates a configuration session and configures the physical network device to correspond with the configuration of the virtual network device. Accordingly, remote configuration of the physical network device is thereby enabled.

In one embodiment, the network client is directly connected to a console port of the physical network device, and is operable to submit configuration commands to the physical network device. The network client may receive configuration commands directly from the network design application, thereby allowing an alternate method for remote configuration of the physical network device via the network design application. In further embodiments, configuring a virtual network device automatically configures the actual physical network device corresponding to the virtual network device in the system, and deployment is completed when each of the physical network devices has been configured Finally, the simulated network is tested at step 607. In one embodiment, testing the simulated network includes testing the viability of a network constructed according to the network design created in step 601, comprising the physical network devices configured at step 605 according to a configuration of virtual network devices at step 603. For example, testing performed at step 607 may include testing the connection states of the connected ports of each physical network device, e.g., whether data may be successfully sent and/or received at a particular port of a network device in the network. Testing may be performed by, for example, generating one or more data packets in the network client of a connected network device and issuing commands to distribute the data packets through a port of a network device to one or more ports of the network device or other network devices in the test (simulated) network. The commands to generate the data packet, and the path with which the data packet will travel may be issued through the network client corresponding to the network device wherein the data packet originates. In some embodiments, the commands may be generated from the network design application. Accordingly, remote testing of the network is possible.

Creating a Network Design

Figure 7:
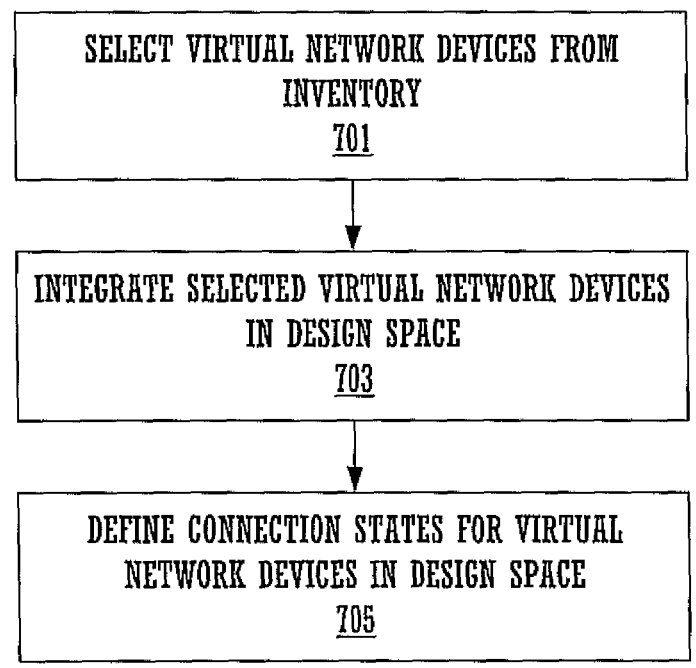
FIG. 7 is a flowchart depicting an exemplary method for creating a network design in a system for automatically configuring remote network devices, in accordance with various embodiments of the claimed subject matter.

With reference now to FIG. 7, a flowchart illustrating an exemplary method 700 for creating a network design in a system for automatically configuring remote network devices is depicted, in accordance with various embodiments of the claimed subject matter. Steps 701-705 describe exemplary steps comprising the method 700 in accordance with the various embodiments herein described.

FIG. 7 may, for example, comprise one embodiment of step 601 of the method 600, as described with reference to FIG. 6. According to the method 700 of FIG. 7, a plurality of virtual network devices is selected at step 701. Virtual network devices may include, but are not limited to, test equipment (e.g., routers, switches and hubs), networks (e.g., private local networks), security devices (e.g., firewalls), attached network storage devices (e.g., servers), VOIP devices (e.g., voip clients) and other devices capable of transmitting data over a network. According to some embodiments, the network design may be created in a network design application, such as the network design application 500 of FIG. 5. According to these embodiments, the network design may comprise virtual network devices representing and/or simulating the physical network devices of a test network corresponding to the network design. In further embodiments, the network design application may include an inventory of virtual network devices which may be used in a network design. This inventory may comprise, for example, the virtual network devices corresponding to an actual physical network device available for use in constructing a test network through the network design application.

In further embodiments, defining a connection may comprise actuating a port on a graphical representation (e.g., image) of a virtual network device in the virtual design lab and actuating a port on a graphical representation of another virtual network device in the virtual design lab. Actuating a pair of ports in the virtual design lab creates a virtual connection between the ports. In still further embodiments, when a virtual connection is created, a graphical representation of the virtual connection may be generated and displayed in the virtual design lab to verify a created virtual connection.

At step 703, each of the plurality of virtual network devices selected in step 701 is integrated in a design space. In one embodiment, the design space may comprise a virtual design lab, simulating a physical network design lab, whereby the virtual network devices comprising the inventory simulate physical network devices "available" to be included and integrated in a network design occupying the network design lab. In one embodiment, a user interface may display both the inventory of virtual network devices and the virtual design lab, wherein a user is able to select a plurality of virtual network devices from the inventory to be included in a test network by actuating on an icon or representation of the virtual network device and actuating a region in the virtual network lab for a desired placement or configuration.

In one embodiment, actuating a region on a virtual network lab after actuating a representation of a virtual network device in an inventory removes the representation of the virtual network device from the inventory and generates a graphical representation corresponding to the virtual network device in the actuated region of the virtual design lab. In one embodiment, integration according to step 703 is completed once the virtual network devices selected in step 701 have been added to network design in the virtual design lab.

At step 705, a plurality of connection states for the virtual network devices comprising the network design is defined. In one embodiment, the connection state for every virtual network device in the network design is defined by selecting a virtual network device having at least one connection interface (e.g., port) connected to another virtual network device according to the network design. Selecting a virtual network device with at least one connected connection interface may be executed by, for example, actuating a graphical representation of the virtual network device in the virtual design lab. In further embodiments, defining the connection state may also comprise defining the specific connections between one or more virtual network devices in the virtual design lab according to the network design.

Defining Specific Connections

Figure 8:
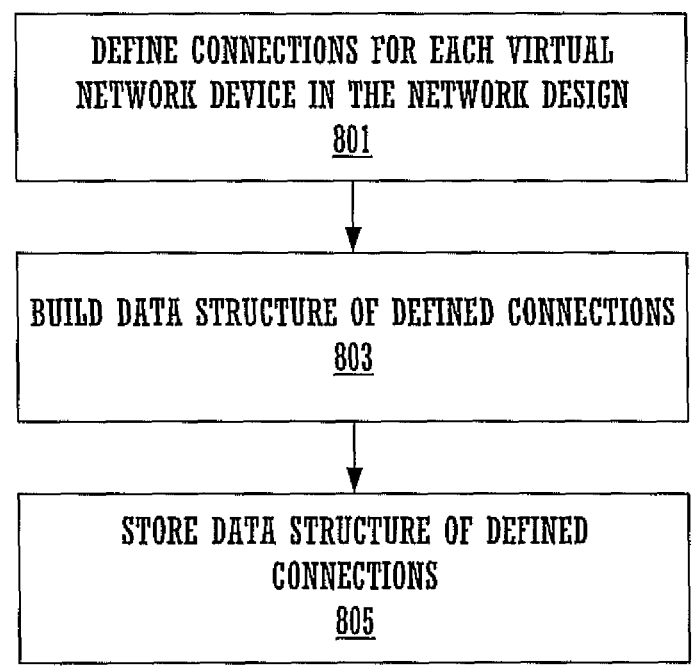
FIG. 8 is a flowchart depicting an exemplary method for defining a plurality of connection states for a plurality of virtual network devices in a system for automatically configuring remote network devices, in accordance with various embodiments of the claimed subject matter.

With reference now to FIG. 8, a flowchart illustrating an exemplary method 800 for defining a plurality of connection states for a plurality of virtual network devices in a system for automatically configuring remote network devices is depicted, in accordance with various embodiments of the claimed subject matter. Steps 801-805 describe exemplary steps comprising the method 800 in accordance with the various embodiments herein described.

FIG. 8 may, for example, comprise one embodiment of step 705 of the method 700, as described with reference to FIG. 7. According to the method 800 of FIG. 8, connections are defined for the virtual network devices comprising the network design at step 801. Defining the plurality of connections for the virtual network devices may, for example, be performed by specifically defining a plurality of connections between one or more virtual network devices and one or more other virtual network devices (including, for example, networks or security hardware) according to the system design. Defining the plurality of specific connections may also comprise defining the specific interfaces (e.g., ports) comprising the specific connections of the system design. For example, a first virtual network device having a plurality of ports may be defined to have a connection from a first port to a port of a second virtual network device and a connection from a second port of the first virtual network device to a port of a third virtual network device.

At step 803, a data structure is created to contain the plurality of specific connections defined in step 801. The data structure may be implemented to include the specific connections for each of the plurality of virtual network devices in the network design. In one embodiment, the data structure may be implemented as, for example, a mapping table containing cross-references for each connection interface of every virtual network device and any other connection interfaces connected to each connection interface of each virtual network device.

Finally, at step 805, the data structure created in step 803 is stored. In one embodiment, the data structure may be stored in a storage component such as a remote server accessible to a network design application used to create a network design.

Creating Virtual Connections

Figure 9:
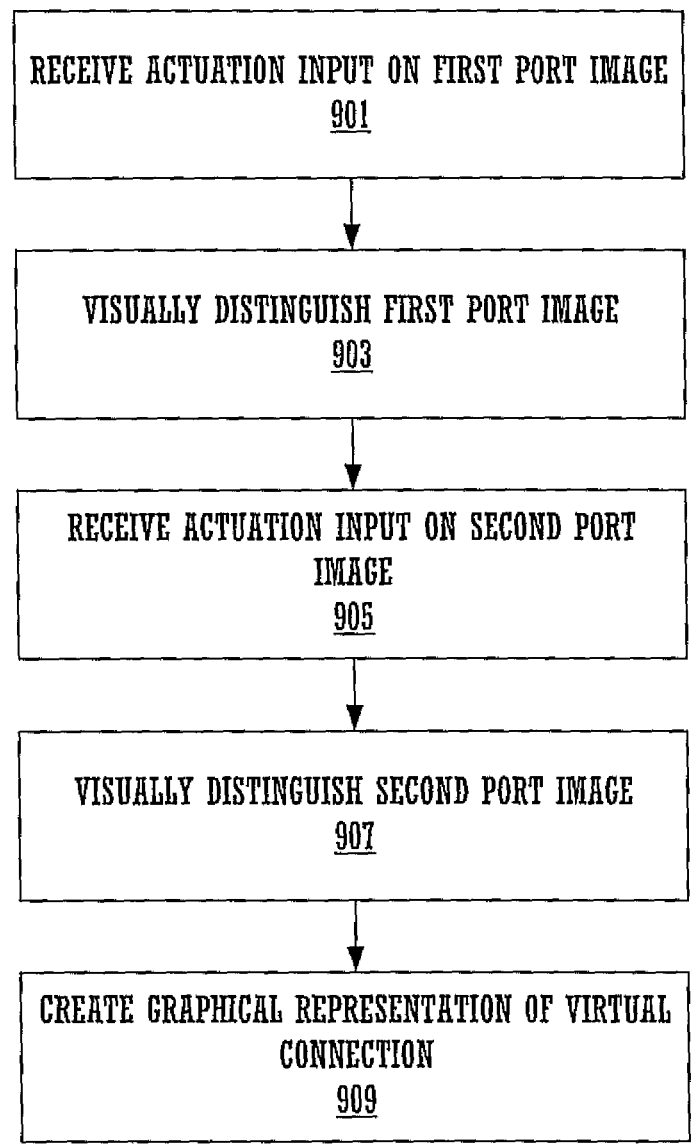
FIG. 9 is a flowchart depicting an exemplary method for creating a connection between a plurality of virtual network devices in a system for automatically configuring remote network devices, in accordance with various embodiments of the claimed subject matter.

With reference now to FIG. 9, a flowchart illustrating an exemplary method 900 for creating a virtual connection between a plurality of virtual network devices in a system for automatically configuring remote network devices is depicted, in accordance with various embodiments of the claimed subject matter. Steps 901-909 describe exemplary steps comprising the method 900 in accordance with the various embodiments herein described.

FIG. 9 may, for example, comprise one embodiment of step 801 of the method 800, as described with reference to FIG. 8. According to the method 900 of FIG. 9, a user-generated actuation on an image of a first connection interface is received at step 901. In one embodiment, a virtual design lab may display graphical representations (e.g., images) of a plurality of virtual network devices comprising a network design. In further embodiments, each of the images of the plurality of virtual network devices may include a connection interface. In still further embodiments, each connection interface may include a plurality of ports or other discrete connection interface units. Accordingly, a user-generated actuation may comprise a user-generated actuation on a region of the image of a virtual network device corresponding to a specific port or unit of the connection interface of the virtual network device.

In some embodiments, a region of an image of a virtual network device may be programmed to correspond to a specific port or unit of the connection interface of the virtual network device by mapping boundaries of an area to correspond to a specific port (or unit). Mapping the boundaries of an area may be performed, for example, by defining an image of a virtual network device using a coordinate system.

At step 903, a graphical representation of a first connection interface unit or port corresponding to the region receiving an actuation in step 901 is visually (visibly) distinguished from the graphical representations of other connection interface units (or ports) of the connection interface for the virtual network device. Visible distinction may comprise, for example, modifying a color of the graphical representation of the connection interface unit. Visible distinction may also comprise exhibiting an icon, or highlighting an area immediately surrounding the graphical representation (e.g., an outline) of the connection interface unit.

At step 905, a user-generated actuation is received on a graphical representation of a connection interface of a virtual network device. In some embodiments, the user-generated actuation may correspond to a second connection interface unit or port of the connection interface. The second connection interface unit or port may comprise an alternate port or other connection interface unit of the connection interface of the same virtual network device. Alternatively, the second connection interface may comprise a port or other connection interface unit on a different virtual network device in the network design.

At step 907, a graphical representation of a second connection interface unit or port corresponding to the region receiving an actuation in step 905 is visually distinguished from the graphical representations of other connection interface units (or ports) of the connection interface for the virtual network device. In some embodiments, the graphical representation of the first and second connection interface unit are modified to match each other, but visually distinguished from the graphical representations of other connection interface units of the virtual network device (if the first connection interface unit is in the same connection interface as the second connection interface unit), or the other connection interface units of both virtual network devices (if the first connection interface unit is disposed on a different connection interface from the second connection interface unit).

For example, the first connection interface unit actuated in step 901 may be visibly actuated with a colored highlight (e.g., green). The second connection interface unit actuated in step 905 is paired with the first connection interface unit and also visibly actuated with a highlight of the same color. In subsequent actuations, pairs of connection interface units may be visually distinguished from other connection interface units as well as other pairs of connections interface units (e.g., using different colors, using different icons, etc. . . . ).

At step 909, a graphical representation of a connection is created to graphically connect the pair of connection interface units distinguished in steps 901-907. The graphical representation may, for example, comprise a line or bar of a predetermined and/or adjustable thickness connecting the pair of distinguished connection interface units in the virtual design lab. In further embodiments, the graphical representation of the connection may be modified to match the distinguishing characteristic (e.g., color, icon) of the connected pair of connection interface units, and, accordingly, visibly distinguished from the graphical representation of other connections.

Configuring Physical Network Device Equivalent

Figure 10:
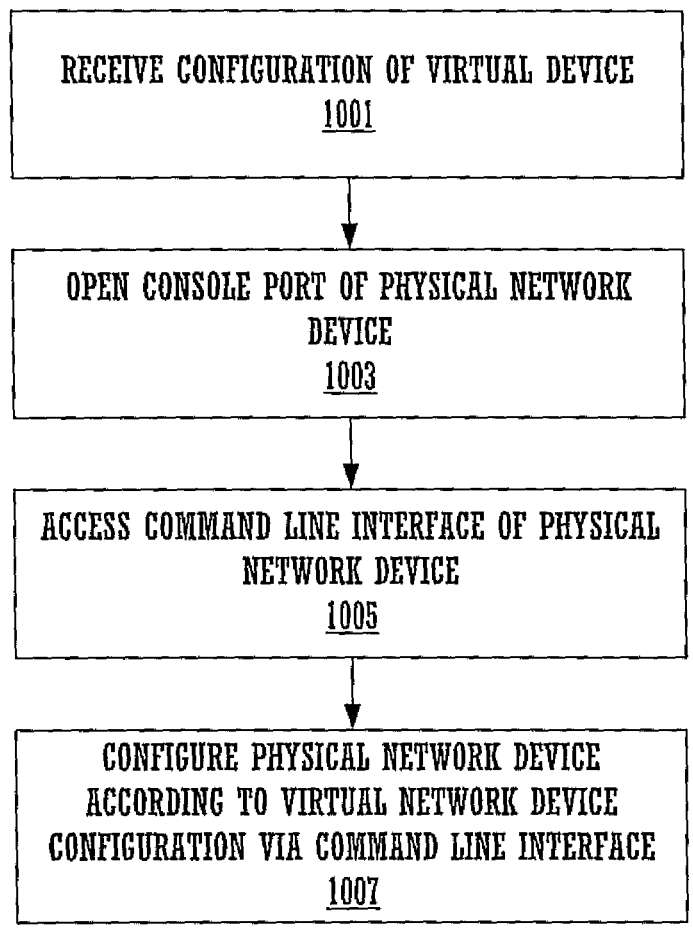
FIG. 10 is a flowchart depicting an exemplary method for configuring a physical network device equivalent of a virtual network device in a system for automatically configuring remote network devices, in accordance with various embodiments of the claimed subject matter.

With reference now to FIG. 10, a flowchart illustrating an exemplary method 1000 for configuring a physical network device equivalent of a virtual network device in a system for automatically configuring remote network devices is depicted, in accordance with various embodiments of the claimed subject matter. Steps 1001-1007 describe exemplary steps comprising the method 1000 in accordance with the various embodiments herein described.

FIG. 10 may, for example, comprise one embodiment of step 605 of the method 600, as described with reference to FIG. 6. According to the method 1000 of FIG. 10, a configuration of a virtual network device corresponding to a physical network device is received at step 1001. The configuration may be generated in, and transmitted from, for example, a network design application, such as a network design application 500 as described with reference to FIG. 5. The configuration may be received in, for example, a network client (e.g., computing device) directly coupled to the physical network device.

At step 1003, the console port of a physical network device is opened. The console port of the physical network device may, for example, comprise opening a console application for the physical network device, wherein text based commands may be submitted according to a syntax and/or semantics. In some embodiments, the console port may comprise a specific physical port disposed on a surface of the physical network device which may be communicatively coupled to an external input device (e.g., a computing device such as the network client), which, when connected, instantiates or allows an instantiation of a console application. In some embodiments, the physical network device may have specific syntax and/or semantics corresponding to a particular hardware manufacturer.

At step 1005, a command line interface is instantiated through the console port (and/or application) of the physical network device through a computing device. In one embodiment, the computing device is the network client directly connected to the physical network device. In further embodiments, the command line interface may be implemented as a graphical user interface which includes configuration functionality.

At step 1007, the physical network device is configured to match the configuration of the corresponding virtual network device received in step 1001. In one embodiment, the physical network device may be configured by entering commands through the command line interface instantiated in step 1005 and made accessible in step 1003. In further embodiments, modifying a configuration of a virtual network device automatically configures the actual physical network device to conform to the modification Generating Test Traffic With reference now to FIG. 11, a flowchart illustrating an exemplary method 1100 for generating test traffic in a system for automatically configuring remote network devices is depicted, in accordance with various embodiments of the claimed subject matter. Steps 1101-1105 describe exemplary steps comprising the method 1100 in accordance with the various embodiments herein described.

Figure 11:
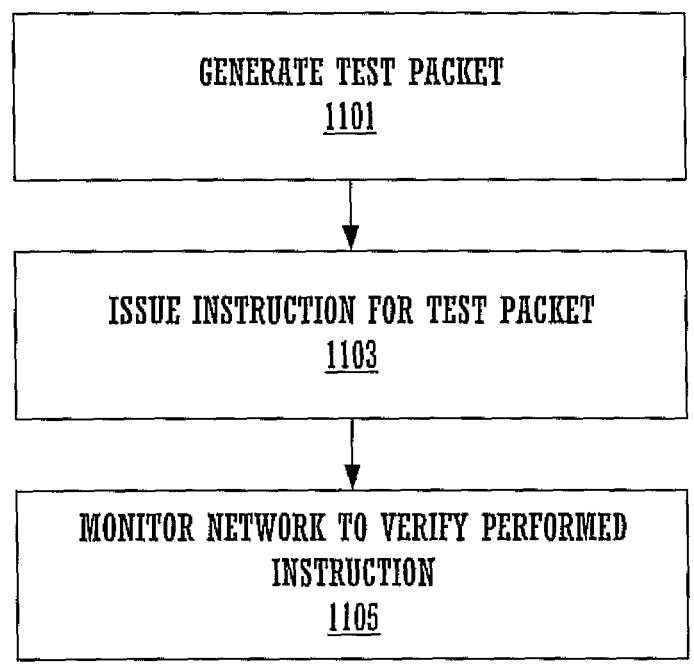
FIG. 11 is a flowchart depicting an exemplary method for generating test traffic in a system for automatically configuring remote network devices, in accordance with various embodiments of the claimed subject matter.

FIG. 11 may, for example, comprise one embodiment of step 607 of the method 600, as described with reference to FIG. 6. According to the method 1100 of FIG. 11, a test packet is generated at step 1101. The test packet may be generated in, for example, a network client physically connected to a network device corresponding to a virtual network device in a network design. In one embodiment, the test packet may be generated in a network client physically connected to a network device in response to a command issued from a network design application communicatively coupled to the network client. In further embodiments, one or more commands to generate a test packet may be issued from the network design application once a network design is deployed. In still further embodiments, one or more test packets may be generated in one or more network clients automatically once a network design is deployed.

In alternate embodiments, generating test packets may comprise physically connecting a network device with dedicated test equipment. Within these embodiments, the test packet may be generated in the dedicated test equipment. In further embodiments, dedicated test equipment may be able to generate a plurality of data packet types. Accordingly, a user may be able to select one or more (or all) of the specific types of data packet to generate during testing.

At step 1103, instructions for the test packet to follow are issued for the test packet. Instructions for the test packet may, for example, be generated in the network client the test packet was generated in. Instructions for the test packet may also be submitted into a network design application and sent to the network client. In embodiments which include dedicated test equipment, instructions may also be generated in the dedicated test equipment for the test packet.

At step 1105, the physical network devices comprising the network according to the network design are monitored to verify the instruction issued at step 1103 was performed. For example, an instruction may include a command for a test packet to be sent from an originating network device to a destination network device in the test network. The path traveled may be specified in the instruction, or according to the routing table for the network. The originating network device, the destination network device, and any network devices in the path traveled are monitored to verify if reception and/or transmittal of the test packet are performed successfully. Monitoring of a network device may be performed by, for example, the network client directly connected to the physical network device and/or a dedicated test device directly connected to the physical network device.

In further embodiments, a test procedure may be saved and/or loaded from a storage component. The test procedures may include the data packets and/or routes according to a determined test procedure. Loading a test procedure may thus comprise repeating a previously created test procedure using a current network design. In one embodiment, the storage component may be locally attached to a local design terminal. In other embodiments, the storage component may be remote, e.g., a centralized repository accessible to a plurality of locally instantiated design applications.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for configuring remote network devices to simulate a network connection between a plurality of physical devices, the system comprising:

a plurality of physical network devices that respectively include specific port configurations, including a first physical network device comprising a first specific port configuration and a second physical network device comprising a second specific port configuration;

a graphical user interface operable to be instantiated remotely from the plurality of physical network devices and comprising an inventory of virtual network devices that respectively have predetermined and unique associations with specific physical network devices of the plurality of physical network devices, the graphical user interface operable to:

create a test network topology design comprising a plurality of graphical representations that specifically indicate the plurality of physical network devices and the specific port configurations included therewith, the plurality of graphical representations including a first virtual network device and a second virtual network device from the inventory of virtual network devices, the first virtual network device having a predetermined and unique association with the first physical network device and the first specific port configuration included therewith, and the second virtual network device having a predetermined and unique association with the second physical network device and the second specific port configuration included therewith, and upon creation of the test network topology design, remove the first and second virtual network devices from the inventory included at the graphical user interface and respectively having the predetermined and unique associations with the first and second physical network devices;

a first network client physically coupled to the first physical network device; and a second network client physically coupled to the second physical network device, wherein the first network client and the second network client are operable to couple the first physical network device with the second physical network device by simulating one or more physical cables that connect the first physical device to the second physical device based on information provided to the first and second virtual network devices about specific connections between the first and second specific port configurations of the first and second physical network devices through the graphical user interface to generate a simulated test network corresponding to the test network topology design.

2. The system of claim 1, wherein the first network client is physically coupled to and operable to communicatively couple a third physical network device to at least one of the first and second physical network devices.

3. The system of claim 1, wherein at least one connection interface of the first network client is physically coupled to at least one connection interface of the first physical network device.

4. The system of claim 3, wherein the connection interface of the first network client comprises an Ethernet port comprising a network interface controller.

5. The system of claim 4, wherein the Ethernet port is a universal serial bus based console port.

6. The system of claim 3, wherein the connection interface of the first physical network device is an Ethernet interface.

7. The system of claim 3, wherein the connection interface of the first physical network device is physically connected to a connection interface of the first network client via an Ethernet cable.

8. The system of claim 1, wherein the first virtual network device is allocated and configured in the graphical user interface according to specifications of the first physical network device, further wherein, the first physical network device is automatically configured to correspond to the configuration of the first virtual network device when the simulated test network is generated.

9. The system of claim 1, wherein a network client is a computing device.

10. The system of claim 9, wherein the computing device is a personal computer (PC).

11. A system for designing a test network, the system comprising:

an inventory comprising a plurality of virtual network devices;

a graphical user interface, which, when instantiated on a computing device, is operable to:

implement a design interface operable to create a test network design comprising virtual network devices from the inventory, and upon creation of the test network design, remove, at the graphical user interface, the virtual network devices from the inventory;

a test network corresponding to the test network design and comprising a plurality of physical network components, the plurality of physical network components respectively comprising specific port configurations, the plurality of physical network components being remotely positioned from the computing device on which the graphical user interface is instantiated, and the plurality of physical network components being coupled to one another by simulated physical cables that are coupled to the plurality of physical network components;

wherein the test network corresponding to the test network design is automatically configured to correspond to the test network design, wherein each virtual network device comprising the test network design has a predetermined and unique association with a specific physical network component of the plurality of physical network components, such that each virtual network device having the predetermined and unique association with the specific physical network component is removed from the inventory upon creation of the test network design, further wherein, the plurality of virtual network devices is configured through the graphical user interface according to hardware specifications of the plurality of physical network components based on information provided to the plurality of virtual network devices about specific connections between the specific port configurations of the plurality of physical network components.

12. The system of claim 11, further comprising:

a design interface, disposed in the graphical user interface, for provisioning a test network design with a plurality of virtual network devices from the inventory in a simulated lab space.

13. The system of claim 11, further comprising a console window disposed in the graphical user interface, wherein the console window is operable to configure the plurality of virtual network devices comprising the test network design.

14. The system of claim 13, wherein the plurality of physical network devices comprising the test network is automatically configured to correspond to a configuration of the plurality of virtual network devices comprising the test network design.

15. The system of claim 11, wherein a configuration of a virtual network device comprising a test network topology is performed remotely from a physical location of the corresponding physical network device comprising the test network.

16. A method for designing a network, the method comprising:

creating, in an instantiation of an integrated software application executing on a computer system, a network design comprising a plurality of virtual network devices that respectively have predetermined and unique associations with specific physical network components of a plurality of physical network components, the plurality of physical network components respectively comprising specific port configurations and being remotely located from the computer system, and the specific physical network components being coupled to one another by simulated physical cables that are coupled to the specific physical network components;

configuring the plurality of virtual network devices comprising the network design;

deploying the network design as a test network comprising the specific physical network components; and testing the viability of the test network;

wherein, the plurality of virtual network devices is configured through a graphical user interface of the integrated software application according to hardware specifications of the specific physical network components based on information provided to the plurality of virtual network devices about a plurality of specific connections between the specific port configurations of the specific physical network components, and wherein, upon creation of the network design, the graphical user interface is operable to remove the plurality of virtual network devices having the predetermined and unique associations with the specific physical network components from an inventory of virtual network devices at the graphical user interface.

17. The method of claim 16, wherein creating the network design further comprises:
   selecting the plurality of virtual network devices from the inventory of virtual network devices to comprise the network design;
   integrating the plurality of virtual network devices comprising the network design in a virtual design space; and
   defining a plurality of connection states for the plurality of virtual network devices comprising the network design.

18. The method of claim 17, wherein defining the plurality of connection states for the plurality of virtual network devices comprising the network design comprises:
   defining the plurality of specific connections between the plurality of virtual network devices according to the specific port configurations of the specific physical network components;
   building a data structure comprising data referencing the plurality of specific connections; and
   storing the data structure.

19. The method of claim 18, wherein defining the plurality of specific connections between the plurality of virtual network device comprises:
   selecting a first connection interface of a first virtual network device and a second connection interface of a second virtual network device; and
   creating a virtual connection between the first connection interface and the second connection interface.

20. The method of claim 19, wherein building a data structure comprising data referencing the plurality of specific connections comprises building a mapping table for the plurality of connections.

21. The method of claim 20, the method further comprising:
   displaying a graphical representation of the mapping table to a user.

22. The method of claim 19, wherein creating a virtual connection between a first connection interface of a first virtual network device and a second connection interface of a second virtual network device comprises:
   receiving as input an actuation on an image of a first connection interface disposed in an image of the first virtual network device;
   visually distinguishing the image of the first connection interface;
   receiving as input an actuation on an image of a second connection interface in an image of the second virtual network device;
   visually distinguishing the image of the second connection interface; and
   creating a graphical representation of a virtual connection connecting the image of the first connection interface with the image of the second connection interface.

23. The method of claim 22, wherein visually distinguishing an image of a connection interface comprises highlighting an outline of the port.

24. The method of claim 19, wherein creating a virtual connection comprises:
   performing router tunneling between a first physical connection interface of a first physical network device corresponding to the first connection interface of the first virtual network device and a second physical connection interface of a second physical network device corresponding to the second connection interface of the second virtual network device.

25. The method of claim 17, wherein the virtual network devices comprising the inventory of virtual network devices corresponds to a plurality of specific physical network device equivalents.

26. The method of claim 25, wherein deploying the network design comprises configuring the plurality of specific physical network device equivalents of the plurality of virtual network devices comprising the network design.

27. The method of claim 26, wherein configuring the plurality of specific physical network device equivalents for the plurality of virtual network devices comprises configuring a physical network device equivalent according to a configuration of the virtual network device corresponding to the physical network device.

28. The method of claim 26, wherein configuring a specific physical network device equivalent of a virtual network device comprises:
   receiving a configuration of a virtual network device corresponding to a physical network device, the configuration comprising a plurality of configuration commands;
   opening a console port of the physical network device;
   accessing a command line interface of the physical network device via a computing device communicatively coupled to the physical network device; and
   configuring the physical network device via the command line interface according to the configuration of the corresponding virtual network device.

29. The method of claim 16, further comprising:
   sending a configuration of the virtual network device to a computing device communicatively coupled to the physical network device corresponding to the virtual network device.

30. The method of claim 29, wherein the computing device is a PC.

31. The method of claim 16, wherein testing the test network comprises:
   initializing a test session for the test network; and
   generating test traffic in the test network.

32. The method of claim 31, wherein generating test traffic comprises:
   generating a test packet at a first physical network device;
   issuing an instruction for a communication of the test packet; and
   monitoring the network to verify the communication is performed according to the instruction.

33. The method of claim 32, wherein issuing an instruction for a communication comprises specifying a destination for the test packet.

34. The method of claim 32, wherein monitoring the network to verify the communication is performed according to the instruction comprises capturing the test packet at the destination.

35. The method of claim 34, wherein a destination for the test packet comprises at a second physical network device in the network.

36. A system for designing a test network, the system comprising:
   a central server having a database for storing an inventory of virtual network devices that respectively have predetermined and unique associations with specific physical network components of a plurality of physical network components, the plurality of physical network components respectively comprising specific port configurations;

a graphical user interface operable to be instantiated on a computing system and operable to:
  create a test network design comprising a plurality of virtual network devices from the inventory, and
  upon creation of the test network design, remove, at the graphical user interface, the plurality of virtual network devices having the predetermined and unique associations with the specific physical network components from the inventory; and
a test network comprising the specific physical network components, the test network corresponding to the test network design, and being operable to be automatically configured to correspond to the test network design,
wherein, the plurality of virtual network devices is configured according to hardware specifications of the specific physical network components based on information provided to the plurality of virtual network devices about a plurality of specific connections between the specific port configurations of the specific physical network components, and
wherein the specific physical network components are coupled to one another by simulated physical cables that are coupled to the specific physical network components.

37. The system of claim 36, further comprising a plurality of network design clients comprising a plurality of remotely distributed network design clients that provide the simulated physical cables.

38. The system of claim 36, wherein the central server further comprises a repository for storing network designs.

39. The system of claim 38, wherein the repository is communicatively coupled to a network design client of the plurality of network design clients.

40. The system of claim 39, wherein a network design client is operable to reference a network design stored in the repository.

41. The system of claim 39, wherein a network design client is operable to store a network design in the repository.

42. The system of claim 36, wherein the central server further comprises a scheduling application for coordinating usage of physical network devices corresponding to the plurality of virtual network devices comprising the inventory.

43. The system of claim 42, wherein the graphical user interface further comprises a reservation application, wherein the reservation application is communicatively coupled to the scheduling application to enable a coordination of exclusive usage of physical network devices corresponding to the plurality virtual network devices comprising the inventory.

* * * * *